3,087,951
MERCURY ACETYLIDES

John H. Wotiz, Mentor, Ohio, assignor to Diamond Alkali Company, Cleveland, Ohio, a corporation of Delaware
No Drawing. Filed Aug. 13, 1959, Ser. No. 833,399
2 Claims. (Cl. 260—431)

The present invention relates to novel polymeric acetylides, their production from alpha, omega diacetylenes, and applications of such materials.

The primary object of the present invention is the provision of novel polymeric mercury acetylides.

A further object of the present invention is to prepare new and useful polyacetylene derivatives.

A still further object of the present invention is to provide novel inorganic-organic monomers and polymers.

These and other objects and advantages of the invention will more fully appear from the following description thereof.

The present invention comprises compounds obtained by reacting an alpha-omega diyne with a source of mercury, e.g., a mercury-containing compound. The compounds of this invention have the structure (I) 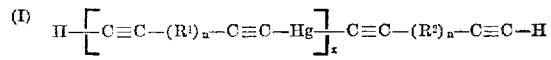

and (II) 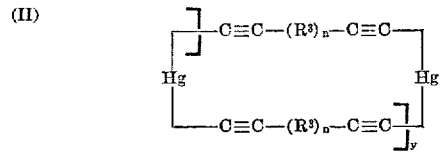

wherein $n$ is a number from 1 to 100, inclusive; $x$ and $y$ are numbers from 1 to 100, inclusive; $R^1$, $R^2$, and $R^3$ are the same or different divalent radicals selected from the group consisting of alkylene, e.g., radicals having the structure —$C_mH_{2m}$— (and corresponding branched chain radicals), wherein $m$ is a number from 1 to 50; arylene, e.g.,

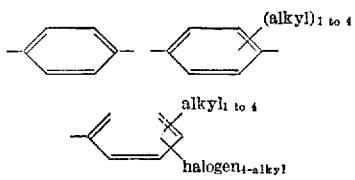

as well as corresponding ortho and meta radicals, oxygen, sulfur, mercury, boron, boron-containing radicals such as

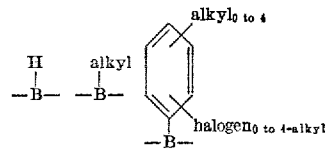

heterocylic radicals such as

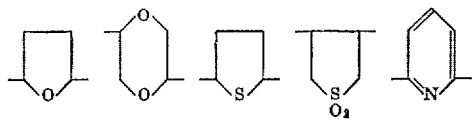

aryl substituted alkylene radicals, e.g.,

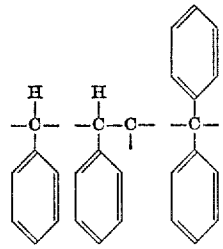

substituted alkylene radicals, e.g.,

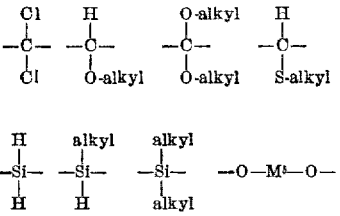

tin, silicon,

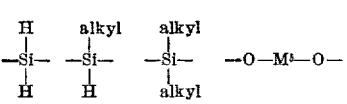

wherein $M^5$ is selected from the group consisting of calcium, barium, zinc, tin, lead,

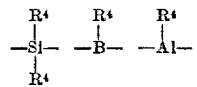

$R^4$ being selected from the group consisting of hydrogen, lower alkyl, i.e., up to about 10 carbon atoms, or aryl radicals, e.g., phenyl or naphthyl, and radicals of the foregoing types which are terminated at each end by the radical

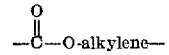

Somewhat more specific and illustrative novel compounds of this invention are mercury derivatives of alpha, omega polyacetylenic hydrocarbons represented by the structure (III)   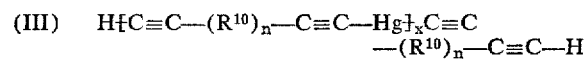

and by the structure (IV)   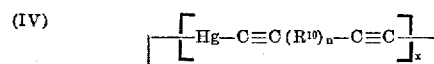

wherein x and n are numbers from 1 to 100, inclusive, e.g., 1 to 10; $R^{10}$ is a divalent hydrocarbon radical, e.g., alkylene, such as methylene, ethylene, propylene, isopropylene, butylene and other branched chain alkylene radicals; an arylene radical such as phenylene or naphthylene radicals; an alkarylene radical such as tolylene or xylylene radicals; or an aralkylene radical such as benzylene or phenethylene radicals.

Other specific and illustrative compounds of this invention are the linear mercury polyacetylenic diesters prepared by reacting an ester-group containing diyne and a mercury compound represented by the structure

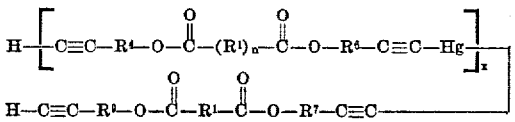

and cyclic compounds of the structure $$\left[\!\!\begin{array}{c} \phantom{|} \\ \phantom{|} \end{array}\!\!\!- C\!\equiv\! C\!-\!R^4\!-\!O\!-\!\overset{O}{\overset{\|}{C}}\!-\!(R^7)_n\!-\!\overset{O}{\overset{\|}{C}}\!-\!O\!-\!R^9\!-\!C\!\equiv\! C\!-\!Hg\!-\!\!\!\right]_y$$

wherein $n$ is a number from 0 to 100, inclusive; $R^4$, $R^6$, $R^7$ and $R^9$ are alkylene radicals such as methylene, ethylene, butylene, propylene, or the like, and $R^1$ is as previously defined.

Illustrative of specific compounds embodying the invention (wherein $x=1$ to 100) are the following:

Bis(1,7-octadiynyl)mercury

H—C≡C—(CH$_2$)$_4$—C≡C—Hg
—C≡C—(CH$_2$)$_4$—C≡C—H 1,7-octadiynyl mercury

H[C≡C—(CH$_2$)$_4$—C≡C—Hg]$_x$

Poly(1,8-nonadiynyl) mercury

H[C≡C—(CH$_2$)$_5$—C≡C—Hg]$_x$C≡C
—(CH$_2$)$_5$—C≡CH $$\left[\!\!-\!Hg\!-\!C\!\equiv\!C\!-\!(CH_2)_5\!-\!C\!\equiv\!C\!-\!\right]_x$$

Bis(1,8-nonadiynyl)mercury

H—C≡C—(CH$_2$)$_5$—C≡C—Hg—C≡C—(CH$_2$)$_5$—C≡CH

Bis(2-propynyl)malonate, Hg derivative $$H\!-\!\!\left[\!-\!CH_2\!-\!\overset{O}{\overset{\|}{C}}\!-\!O\!-\!CH_2\!-\!O\!-\!\overset{O}{\overset{\|}{C}}\!-\!CH_2\!-\!C\!\equiv\!C\!-\!Hg\!-\!\right]_x\!\!\!-$$

1,1-mercuribis-(4,9-dioxa-1,11-dodecadiyne-5,8-dione $$\begin{array}{c} C\!\equiv\!C\!-\!CH_2\!-\!O\!-\!\overset{O}{\overset{\|}{C}}\!-\!CH_2\!-\!CH_2\!-\!\overset{O}{\overset{\|}{C}}\!-\!O\!-\!CH_2\!-\!C\!\equiv\!C\!-\!H \\ Hg\!\!\diagup \\ \phantom{Hg}\!\!\diagdown C\!\equiv\!C\!-\!CH_2\!-\!O\!-\!\overset{O}{\overset{\|}{C}}\!-\!CH_2\!-\!CH_2\!-\!\overset{O}{\overset{\|}{C}}\!-\!O\!-\!CH_2\!-\!C\!\equiv\!C\!-\!H \end{array}$$

Copolymer of bis(2-propynyl) terephthalate and Hg $$-\!\!\left[\!-\!C\!\equiv\!C\!-\!CH_2\!-\!O\!-\!\overset{O}{\overset{\|}{C}}\!\!\left\langle\!\!\bigcirc\!\!\right\rangle\!\!\overset{O}{\overset{\|}{C}}\!-\!O\!-\!CH_2\!-\!C\!\equiv\!C\!-\!Hg\!-\!\right]_n\!\!\!-$$

Copolymer of bis(2-propynyl) tetrachloroterephthalate and Hg $$-\!\!\left[\!-\!C\!\equiv\!C\!-\!CH_2\!-\!O\!-\!\overset{O}{\overset{\|}{C}}\!\!\left\langle\!\!\overset{Cl\phantom{X}Cl}{\underset{Cl\phantom{X}Cl}{\bigcirc}}\!\!\right\rangle\!\!\overset{O}{\overset{\|}{C}}\!-\!O\!-\!CH_2\!-\!C\!\equiv\!C\!-\!Hg\!-\!\right]_n\!\!\!-$$

Linear polymeric mercury derivative of 4-pentynyl succinate $$H\!-\!\!\left[\!-\!C\!\equiv\!C\!-\!(CH_2)_3\!-\!O\!-\!\overset{O}{\overset{\|}{C}}\!-\!(CH_2)_2\!-\!\overset{O}{\overset{\|}{C}}\!-\!O\!-\!(CH_2)_3\!-\!C\!\equiv\!C\!-\!Hg\!-\!\right]_n\!\!\!-C\!\equiv\!C\!-\!(CH_2)_3\!-\!O\!-\!\overset{O}{\overset{\|}{C}}\!-\!(CH_2)_2\!-\!\overset{O}{\overset{\|}{C}}\!-\!O\!-\!(CH_2)_3\!-\!C\!\equiv\!CH$$

Cyclic polymeric mercury derivative of 4-pentynyl succinate $$\left[\!\!-\!C\!\equiv\!C\!-\!(CH_2)_3\!-\!O\!-\!\overset{O}{\overset{\|}{C}}\!-\!(CH_2)_2\!-\!\overset{O}{\overset{\|}{C}}\!-\!O\!-\!(CH_2)_3\!-\!C\!\equiv\!C\!-\!Hg\!-\!\right]_x$$

Linear polymeric mercury derivative of 4-pentynyl tetrachloroterephthalate $$H\!-\!\!\left[\!-\!C\!\equiv\!C\!-\!(CH_2)_3\!-\!O\!-\!\overset{O}{\overset{\|}{C}}\!\!\left\langle\!\!\overset{Cl\phantom{X}Cl}{\underset{Cl\phantom{X}Cl}{\bigcirc}}\!\!\right\rangle\!\!\overset{O}{\overset{\|}{C}}\!-\!O\!-\!(CH_2)_3\!-\!C\!\equiv\!C\!-\!Hg\!-\!\right]_x\!\!\!-C\!\equiv\!C\!-\!(CH_2)_3\!-\!O\!-\!\overset{O}{\overset{\|}{C}}\!\!\left\langle\!\!\overset{Cl\phantom{X}Cl}{\underset{Cl\phantom{X}Cl}{\bigcirc}}\!\!\right\rangle\!\!\overset{O}{\overset{\|}{C}}\!-\!O\!-\!(CH_2)_3\!-\!C\!\equiv\!CH$$

Cyclic polymeric mercury derivative of 4-pentynyl tetrachloroterephthalate $$\left[\!\!-\!C\!\equiv\!C\!-\!(CH_2)_3\!-\!O\!-\!\overset{O}{\overset{\|}{C}}\!\!\left\langle\!\!\bigcirc\!\!\right\rangle\!\!\overset{O}{\overset{\|}{C}}\!-\!O\!-\!(CH_2)_3\!-\!C\!\equiv\!C\!-\!Hg\!-\!\right]_x$$

Compounds of this invention generally are characterized by low water solubility; solubility in organic solvents (depending on the degree of polymerization, size and nature of the R groups); and lack of offensive odor characteristic of relatively volatile, lower molecular weight dialkyl mercury compounds, e.g., $(C_2H_5)_2Hg$ or $(C_4H_9C\equiv C)_2Hg$.

Compounds of this invention can be formed by chemically reacting an alpha, omega-diacetylene (diyne) of the structure $$HC\equiv C\!-\!R^1\!-\!C\equiv CH$$

wherein $R^1$ is as previously defined, with a mercury-containing compound which provides available mercuric cations such as an alkali metal mercuric halide, e.g., sodium, potassium, lithium, cesium or rubidium mercuric halides, potassium mercuric iodide being preferred at present, or an alkali metal mercuric cyanide, e.g., potassium mercuric cyanide.

Thus, the reaction may be illustrated as follows:

$$H\!-\!C\!\equiv\!C\!-\!R\!-\!C\!\equiv\!C\!-\!H \xrightarrow[KOH]{K_2HgI_4}$$

$$H\!-\!\!\left[\!-\!C\!\equiv\!C\!-\!R\!-\!C\!\equiv\!C\!-\!Hg\!-\!\right]_x\!\!\!-C\!\equiv\!C\!-\!R\!-\!C\!\equiv\!C\!-\!H +$$

$$\begin{array}{c} \phantom{Hg}\!\!\diagup\!-\!C\!\equiv\!C\!-\!R\!-\!C\!\equiv\!C\!-\!\!\diagdown \\ Hg\phantom{XXXXXXXXXXXX}Hg \\ \phantom{Hg}\!\!\diagdown\!-\!C\!\equiv\!C\!-\!R\!-\!C\!\equiv\!C\!-\!\!\diagup \end{array}\!\!\!\right]_x$$

The alpha, omega diacetylenes used in the preparation of compounds of this invention can be prepared (1) by reacting disodium acetylide with an alpha, omega dihalide, e.g., $$2Na\!-\!C\!\equiv\!C\!-\!Na + Br\!-\!(CH_2)_n\!-\!Br$$
$$\rightarrow H\!-\!C\!\equiv\!C\!-\!(CH_2)_n\!-\!C\!\equiv\!C\!-\!H_x$$

as described in Ser. No. 769,583, filed October 28, 1958.

In general, reaction in high dilution favors the formation of cyclic products, provided that the size or shape of the molecule does not prevent intra-molecular reaction (ring formation). Addition of the mercury-containing reagent to the diyne favors formation of a cyclic product; the reverse addition favors the formation of a linear product.

The reaction generally should be carried out at a pH greater than 7, and preferably greater than 8.5. Increasing the basicity increases the rate of reaction. The base, OH$^-$, neutralizes the H$^+$ produced in the $$-\!C\!\equiv\!C\!-\!H + Hg^{++} \rightarrow -\!C\!\equiv\!C\!-\!Hg\!-\!C\!\equiv\!C\!-\! + 2H^+$$

reaction. Thus, one may control the rate of reaction by pH control. This may be accomplished by a dropwise addition of dilute base to a neutral mixture of $K_2HgI_4$ and the diyne. The rate of reaction typically is followed with a pH meter. Such a controlled reaction at a pH of 8.0 to 8.5 usually leads to the formation of lower molecular weight products, e.g., $$H\!-\!C\!\equiv\!C\!-\!R\!-\!C\!\equiv\!C\!-\!Hg\!-\!C\!\equiv\!C\!-\!R\!-\!C\!\equiv\!C\!-\!H$$

On the other hand, an excess of base leads to a rapid formation of higher molecular weight mercury acetylides. Accordingly, instead of keeping the pH constant during the reaction by a dropwise addition of base, one may use a buffered system. The reactions are conveniently carried out at room temperature. Higher temperatures, e.g., 70° C., lead to formation of discolored products, mainly due to a liberation of mercury. Elevated pressures are not required.

If desired, a suitable solvent for one or more of the reactants can be employed. Thus, the diyne can be dissolved in a lower alkanol such as methanol or ethanol. In many instances, the solvent may contain a small amount of water, e.g., 5% to 10%.

In general, the products of this invention can be recovered from water by filtration, centrifugation or the like, washed with an alcohol or water-alcohol mixture and dried.

The analysis of the reaction product, linear vs. cyclic, is on the basis of spectroscopic analysis. The presence of a terminal triple bond, —C≡C—H, is evident from the absorption bands near 3.02 and 4.7μ. These bands are naturally absent in a cyclic mercury acetylide. Preferably, the reaction of the mercury compound and the alpha, omega diacetylene is carried out in the presence of a solvent such as dioxane, tetrahydrofuran, a lower ketone such as methyl ethyl ketone, an alkanol such as ethanol, e.g., anhydrous or aqueous ethanol and, broadly, those other solvents which do not react with the alpha, omega diacetylenes defined in the structure above.

The reaction may take place at the reflux temperature of the reaction mixture, e.g., about 70° to 80° C., employing aqueous ethanol as the solvent; however, in many instances, the reaction is preferably carried out at room temperature. At times, it is desirable that the reaction be initiated at a temperature below room temperature such as about —10° C.

Generally, the above chemical reaction is carried out over a period of about ½ to 2 hours, although in certain instances, reaction times up to about 30 hours may be employed. The nature of the resultant product varies with the rate of addition and concentration of the reactants. Yields are generally better than 50%, typically better than 90%.

Purification of the resultant product is carried out by washing with water or organic solvents and drying. However, caution should be exercised in the heating of a linear mercuric polyyne of this invention is that heating may cause a change in chemical structure such as cyclization, as evidenced by infra-red data. For example, the following cyclization of the corresponding linear compound may occur:

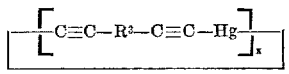

wherein R³ is as previously defined. Accordingly, purification is preferably accomplished through washing with an aqueous-organic solvent such as 50% aqueous alcohol.

The novel organic mercury compounds of this invention are useful as chemical intermediates and exhibit biological activity in addition to applications in the field of polymers. More specifically, such compounds are fungicidal as in the control of blight fungi.

While compounds of this invention may be employed in a variety of applications, biologically active or otherwise, when employed as biologically active materials, it will be understood, of course, that such compounds may be utilized in diverse formulations, both liquid and solid, including finely-divided powders and granular material as well as liquids such as solutions, concentrates, emulsifiable concentrates, wettable powders, slurries and the like, depending upon the application intended and the formulation media desired. These compounds may be used alone or in combination with other known biologically active materials such as steroids, organic phosphate pesticides, chlorinated hydrocarbon insecticides, foliage and soil fungicides, antiseptics, medicinals and the like.

Thus, it will be appreciated that compounds of this invention may be employed to form biologically active substances containing such compounds as essential active ingredients thereof which compositions may also include finely-divided dry or liquid diluents, extenders, fillers, conditioners, including clays, such as talc, spent catalysts, aluminum silica materials, liquids, solvents, diluents or the like, including water and various organic liquids such as benzene, toluene, chlorinated benzene, acetone, cyclohexanone, xylene, carbon tetrachloride, carbon disulfide, alcohol and various mixtures thereof.

When liquid formulations are employed or dry materials prepared which are to be used in liquid form, it is desirable in certain instances additionally to employ a wetting, emulsifying or dispersing agent to facilitate the use of the formulation, e.g., Triton X–155 (alkyl aryl polyether alcohol—U.S. Patent 2,504,064).

The term "carrier" as employed in the specification and claims is intended to refer broadly to materials constituting a major proportion of a biologically-active or other formulations and hence includes finely-divided materials, both liquids and solids, as aforementioned and conveniently used in such applications.

In order that those skilled in the art may more completely understand the present invention and the preferred methods by which the same may be carried into effect, the following specific examples are offered.

EXAMPLE 1

*Preparation of Bis(1,8-Nonadiynyl)Mercury*

An alkaline mercuric iodide reagent is prepared in the following manner: To a solution of 326 g. potassium iodide in 326 ml. of distilled water is added 132 g. mercuric chloride with stirring until solution is complete. The solution is filtered and 250 ml. of 10% aqueous sodium hydroxide solution is added. This solution contains 98 g. of mercury in 700 ml. or 0.14 g. per ml.

100 ml. of the above mercuric reagent is placed in a container and neutralized with concentrated HCl. The pH is adjusted to about 8 with 5% sodium hydroxide solution. 10.4 ml. (8.4 g.) of 1,8-nonadiyne in 200 ml. of 95% ethanol is added dropwise alternately with the base as necessary to maintain a pH of about 8. The pH is then increased to about 10 after all the diyne is added. The resulting white precipitate is suction filtered and washed several times with 50% aqueous alcohol. The product is then dried over phosphorus pentoxide at 1 mm. Hg pressure, yielding a white powder. The desired $C_{18}H_{22}Hg$ is indicated through the following elemental analytical data:

| Element | Actual, Percent by Wgt. | Calculated, Percent by Wgt. |
|---|---|---|
| C | 49.1 | 49.2 |
| H | 4.8 | 5.1 |
| Hg | 45.3 | 45.7 |

Infra red spectra indicate presence of a terminal triple bond and acidic hydrogen at 3.1 microns. This product has a calculated molecular weight of 439 and an observed molecular weight of 425 and is partially soluble in benzene, M.P. 72–73° C.

EXAMPLE 2

In order to demonstrate fungicidal activity, spore germination tests on glass slides are conducted via the test tube dilution method adopted from the procedure recommended by the American Phytopathological Society's Committee on standardization of fungicidal tests. In this procedure, the product of Example 1 in aqueous formulations at concentrations of 1000, 100, 10 and 1.0 p.p.m. is tested for its ability to inhibit germination of spores from 7 to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Results indicate that a concentration of about 100 p.p.m. affords disease control for both *A. oleracea* and *M. fructicola*.

EXAMPLE 3

A tomato foliage disease test is run measuring the ability of the product of Example 1 to protect tomato foliage against infection by the early blight fungus, *Alternia solani*, and the late blight fungus, *Phytophthora infestans*. The method employs tomato plants 5″ to 7″ high of the variety Bonny Best. Duplicate plants, one set for each test fungus, are sprayed with 100 ml. of the test formulation at a toxicant concentration (2000 p.p.m. product of Example 1—5% acetone—0.01% Triton X-155—balance water) using 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. or 150,000 sporangia of *P. infestans* per ml. The atomizer used delivers 20 ml. in 30 seconds.

The thus-treated plants are held in a saturated water vapor atmosphere for 24 hours at 70° F. for early blight and 60° F. for late blight to permit spore germination and infection before removal to a greenhouse. After 2 to 4 days, lesion counts are made on the three uppermost fully expanded leaves. The data are converted to percent disease control based on the number of lesions obtained on the control plants. This test shows that at a concentration of 2000 p.p.m. the product of Example 1 affords 99% control for the early blight and 50% control for the late blight.

EXAMPLE 4

To evaluate bactericidal activity, the product of Example 1 is mixed with distilled water containing 5% acetone and 0.01% Triton X-155, at a concentration of 1000 p.p.m. 5 ml. of the test formulation are put in each of four test tubes. To each test tube is added one of the organisms: *Erwinia amylovora*, *Xanthomonas phaseoli*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth is incubated for 48 hours at 37° C. when growth is rated as follows: A equals no growth; B equals slight growth; C equals moderate growth; and D equals heavy growth. Using this procedure, the product of this example receives ratings of from B to C in each case.

EXAMPLE 5

Seeds of perennial rye grass and radish are treated in Petri dishes with aqueous suspensions of the product of Example 1 at 1000 p.p.m. (1000 p.p.m. product of Example 1—5% acetone—0.01% Triton X-155—balance water). Lots of 25 seeds of each type are scattered in separate dishes containing filter paper discs moistened with 5 ml. of the test formulation at each concentration. After 7 to 10 days under controlled conditions the product of Example 1 is given a rating which corresponds to the concentration that inhibits germination of half of the spores (ED 50) in the test or greater. Using this test, the product of Example 1 causes no injury to the seeds of this example.

EXAMPLE 6

To test phytotoxic effects, tomato plants, variety Bonny Best, 5″ to 7″ tall; corn, variety Cornell M-1 (field corn), 4″ to 6″ tall; bean, variety Tendergreen, just as the trifoliate leaves are beginning to unfold; and oats, variety Clinton, 3″ to 5″ tall, are sprayed with an aqueous test formulation (0.64% product of Example 1—5% acetone—0.01% Triton X-155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, results indicate that the product of Example 1 causes no injury to the plants used in the test.

EXAMPLE 7

To detect root absorption and translocation, tomato plants, variety Bonny Best, 5″ to 7″ tall, and corn plants, variety Cornell M-1 (field corn), 4″ to 6″ tall, are treated by pouring 51 ml. of 2000 p.p.m. aqueous test formulation (2000 p.p.m. product of Example 1—5% acetone—0.01% Triton X-155—balance water) onto the soil of 4-inch pots (102 mg./pot or approximately equivalent to 128 lbs./acre) in which the plants are growing. Plants are held under controlled greenhouse conditions for at least 10 days before examination after which phytotoxicity ratings are given based on a scale from 0 for no injury to 11 for plant kill. Using this procedure, results indicate that the product of Example 1 causes no injury to the plants used in the test.

EXAMPLE 8

To evaluate the effect of the product of Example 1 upon the germination of seeds in soil, a mixture of seed of six crop plants is broadcast in 8″ x 8″ x 2″ metal cake pans filled to within ½ inch of the top with composted greenhouse soil. The seed is uniformly covered with about ¼ inch of soil and watered. After 24 hours, 80 ml. of an aqueous test formulation (320 mg. product of Example 1—5% acetone—0.01% Triton X-155—balance water) uniformly over the surface of the pan. This is equivalent to 64 lbs./acre. The seed mixture contains representatives of three broadleafs: turnip, flax and alfalfa, and three grasses: wheat, millet and rye grass. Two weeks after treatment, records are taken on seedling stand as compared to the controls. Using this procedure, results indicate that the product of Example 1 causes no injury to the seeds used in the test.

EXAMPLE 9

*Preperation of the Acetylenic Polymer of Bis(1,8-Nonadiynyl)mercury*

50 ml. of the mercuric reagent described in Example 1 is placed in a container and the solution neutralized with concentrated HCl. 15 ml. (100.4 millimoles) 1,8-nonadiyne in 100 ml. 95% ethanol is added, 5 N aqueous sodium hydroxide solution is then added to the mixture with stirring until a white polymer precipitate forms. The polymer is separated by filtration. This polymer is insoluble in water and chars on decomposing at about 190° to 200° C.

EXAMPLE 10

*Preparation of 1,1′-Mercuribis-(4,9-Dioxa-1,11-Doecadiyne-5,8-Dione)*

500 ml. of mercuric iodide reagent, described in Example 1 is placed in a container and neutralized with concentrated HCl solution. To this mixture is added a solution of 19.4 g. of dipropargyl-succinate in 200 ml. of 95% aqueous alcohol. 5 N sodium hydroxide is added gradually to precipitate the desired product. Upon filtering and washing with 50% aqueous alcohol, the desired product is air dried. This desired $C_{20}H_{18}O_8Hg$ is indicated through infra red data. The white compound decomposes at about 195° C.

EXAMPLE 11

Employing the fungicidal evaluation procedure given in Example 2, and the product of Example 10, results indicate on concentration of less than 10 p.p.m. affords disease control for *A. oleracea* and *M. fructicola*, respectively.

EXAMPLE 12

Biological utility of the product of Example 10 is further demonstrated employing the fungicide evaluation procedure given in Example 3. Employing this test the product of Example 10 receives an ED 95 value (that concentration which affords 95% or better control) of 90 p.p.m. for the early blight fungus and 600 p.p.m for the late blight fungus.

EXAMPLE 13

The following test measures the ability of the product of Example 10 to protect pea seed and seedlings from seed decay and damping off fungi (Pythium and Fusarium). In this test infested soil in 4″ x 4″ x 3″ plant band boxes is treated by a soil drench-mix method at the equivalent rate of 128 lbs./acre. Treatment is accomplished by pouring 70 ml. of a 200 p.p.m. test formulation (2000 p.p.m. product of Example 10—5% acetone—0.01% Triton X-155—balance water) on the surface of the soil. This is allowed to stand until the next day when the soil is removed from each box and thoroughly mixed before being replaced in the box. Three days after treatment, 25 pea seeds, variety Perfection, are planted to a uniform depth in each box. Untreated checks and standardized material are included in each test in addition to a check planted in sterilized soil. Percentage stand recorded 14 days after planting shows better than 60% stand, thus indicating a systemic fungicidal activity.

EXAMPLE 14

Employing the bactericidal evaluation of Example 4, the product of Example 10 affords 100% bacteria control at a concentration of 500 p.p.m.

EXAMPLE 15

Further biological utility is demonstrated through the results obtained from the plant growth regulant test procedure given in Example 6. Employing this test, the product of Example 10 does not injure the tomato, corn and oat plants; however, the bean plants were 100% defoliated.

EXAMPLE 16

Employing the herbicidal evaluation procedure of Example 7, the product of Example 10 receives ratings of 0 for the tomato plant and 11 for the bean plant, thus demonstrating selective herbicidal activity.

EXAMPLE 17

In order to make an in vitro valuation of the product of Example 10 as a contact poison, nonplant parasite nematodes (*Panagrellus redivivus*) are exposed to the test chemical in small watch glasses (27 mm. diameter x 8 mm. deep), within a 9 cm. Petri dish. An aqueous test formulation (1000 p.p.m. product of Example 10—5% aceton—0.01% Triton X-155—balance water) is used. Results are recorded 24 hours after treatment and from these it is shown that a concentration of 100 p.p.m. product of Example 10 affords better than 90% nematode control.

EXAMPLE 18

*Preparation of the Polymer of 1,1′-Mercuribis-(4,9-Dioxa-1,11-decadiyne-5,8-Dione)*

The subject polymer is prepared by repeating the procedure in Example 10 with the exception that the succinate is added to the basic mercuric iodide solution without neutralization. The resultant polymer is insoluble in water and all organic and inorganic solvents except strong acids such as boiling nitric and sulfuric.

EXAMPLE 19

*Preparation of Hg (II) Derivatives of Dipropargylterephthalate*

47 ml. (0.033 mol) $K_2Hg_4$ is neutralized with concentrated HCl. Dipropargylterephthalate (24 g., 0.1 mol) in 300 ml. warm methanol is added. Aqueous 5 N NaOH is added dropwise to the stirred mixture to form the derivative. The resulting mixture is poured into a liter of cold $H_2O$ and filtered with suction. Water washing, drying at 56°/1 mm. Hg gives 25 g. white, product, dec. pt. 150°–160° C. (gradual darkening). *Analysis.*—Found: C, 40.8; H, 3.2; Hg, 23.4. The IR spectrum shows no evidence for $\equiv C-H$.

EXAMPLE 20

*Preparation of Hg (II) Derivatives of Dipropargyltetrachloroterephthalate*

47 ml. (0.033 mol) $K_2Hg_4$ is neutralized with HCl and 38 g. (0.1 mol) dipropargyltetrachloroterephthalate in 600 ml. 95% EtOH added. 5 N NaOH is added dropwise to form the Hg derivative. The basic mixture is poured into a liter of cold $H_2O$. Workup gives 43 g. white product, MP.>200° C. *Analysis.*—Found: C, 36.4; H, 0.9; Hg, 13.0. IR spectrum shows C=O and $\equiv C-H$.

EXAMPLE 21

*Preparation of Bis(1,7-Octadiynyl)Mercury*

147 ml. (0.1 mol) $K_2HgI_4$ is neutralized with concentrated HCl. 31.8 (0.3 mol) 1,7-octadiyne in 200 ml. 95% EtOH is added. 5 N NaOH added dropwise causes precipitation of a white product. When a pH of 10 is reached, the product is filtered, washed twice with 1:1 $H_2O$—EtOH, and vacuum dried. Precipitation from acetone with $H_2O$ gives 35 g. product, M.P. 63°–64° C. *Analysis.*—Calcd. for $C_{16}H_{15}Hg$: C, 46.75; H, 4.4; Hg, 48.8. Found: C, 47.4; H, 4.7; Hg, 45.0. IR spectrum indicates the structure:

$$H-C\equiv C(CH_2)_4-C\equiv C-Hg$$
$$-C\equiv C-(CH_2)_4-C\equiv C-H$$

EXAMPLE 22

*Preparation of Hg (II) Derivative of 1,7-Octadiyne*

To 200 ml. (0.15 mol) $K_2HgI_4$ is added 15.9 g. (0.15 mol) 1,7-octadiyne in 100 ml. 95% EtOH. Filtering, washing with 1:1 aqueous alcohol, and vacuum drying gives 25 g. of white product, dec. pt. 230° C. *Analysis.*—Found: C, 41.4; H, 3.4; Hg, 49.2. IR spectrum shows strong $C\equiv C$ and $\equiv C-H$.

EXAMPLE 23

*Preparation of Hg (II) Derivative of Diproparglymalonate*

50 ml. (0.35 mol) $K_2HgI_4$ is neutralized with concentrated HCl and 18 g. (0.1 mol) diproparglymalonate in 250 ml. 95% EtOH is added. 5 N NaOH is added dropwise. The product is filtered and washed yielding 12 g. of gray powder, dec. pt. 150°–160° C. *Analysis.*—Found: C, 23.0; H, 1.9; Hg, 53.3.

EXAMPLE 24

*Hg (II) Derivative of Bis(4-Pentynyl) Succinate*

5.8 g. (0.023 mol) of bis(4-pentynyl) succinate is dissolved in 100 ml. of 95% EtOH. To this is added 0.0084 mol of $K_2HgI_4$ solution (basic pH 10). A milky suspension forms and is quenched in 500 ml. $H_2O$. A white, taffy-like polymer results (5.1 g., M.P. 46°–50° C.) which on standing, crystallizes to a product melting at 64°–66° C. *Analysis.*—Found: C, 42.3; H, 4.1; Hg, 31.0.

EXAMPLE 25

*Hg (II) Derivative of Bis(4-Pentynyl) Tetrachloroterephthalate*

0.016 mol $K_2HgI_4$ is neutralized with concentrated HCl. 21.8 g. (0.05 mol) of bis(4-pentynyl)tetrachloroterephthalate is dissolved in 600 ml. of 95% EtOH (heated to 50°–60° C. to effect solution) and added to the Hg reagent. 5 N NaOH is added (buret) to pH 8. Some crystalline material, 2 g., M.P. 91°–92°, and polymer, 18 g., are found. The polymer is extracted with hot benzene.

ANALYSIS

| Percent | Found | | | Calc'd | |
|---|---|---|---|---|---|
| | I (Sol. hot $C_6H_6$, M.P. 91–92° C.) | II (Sol. hot $C_6H_6$ amorphous) | III (Insol. hot $C_6H_6$ amorphous) | $C_{36}H_{26}O_8Cl_8Hg$ (linear polymer) | $C_{18}H_{12}O_4Cl_4Hg$ (cyclic polymer) |
| C | 37.5 | 40.5 | 40.4 | 40.4 | 34.0 |
| H | 2.4 | 2.6 | 2.8 | 2.4 | 1.9 |
| Hg | 15.6 | 17.6 | 12.9, 12.6 | 18.7 | 31.6 |
| Cl | 26.8 | 25.0 | 25.0 | 26.5 | 22.4 |

Infra red of all of three of the products shows ≡CH, C≡C,

and indicates that they are mixtures of linear polymers.

It is to be understood that although the invention has been described with specific reference to particular embodiments thereof, it is not to be so limited since changes and alterations therein may be made which are within the full intended scope of this invention as defined by the appended claims.

What is claimed is:
1. Bis-1,7-octadiynyl mercury.
2. Bis-1,8-nonadiynyl mercury.

References Cited in the file of this patent

UNITED STATES PATENTS

| 2,145,595 | Gornitz et al. | Jan. 31, 1939 |
| 2,251,778 | Bonrath et al. | Aug. 5, 1941 |
| 2,329,883 | Daskais | Sept. 21, 1943 |
| 2,329,884 | Daskais | Sept. 21, 1943 |
| 2,369,339 | Daskais | Feb. 13, 1945 |

FOREIGN PATENTS

| 484,090 | Great Britain | Apr. 28, 1938 |

OTHER REFERENCES

"Organo Metallic Compounds," G. E. Cotes (London), 1956.

UNITED STATES PATENT OFFICE
CERTIFICATE OF CORRECTION

Patent No. 3,087,951                  April 30, 1963

John H. Wotiz

It is hereby certified that error appears in the above numbered patent requiring correction and that the said Letters Patent should read as corrected below.

Column 1, lines 45 to 50, the formula should appear as shown below instead of as in the patent:

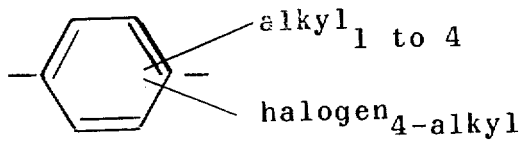

column 3, lines 53 and 54, for that portion of the structural formula reading:

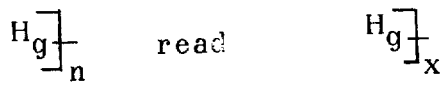

column 4, line 36, for "$\rightarrow H-C\equiv C\mathord{-}(CH_2)_n-C\equiv C\mathord{-}H_x$" read -- $\rightarrow H-C\equiv C\mathord{-}(CH_2)_n-C\equiv C\mathord{-}_x H$ --; column 5, line 41, for "is" read -- in --; column 8, line 55, for "Doecadiyne", in italic, read -- Dodecadiyne --, in italics; line 61, for "precipiate" read -- precipitate --; line 63, for "$C_{20}H_{18}O_8H_g$" read -- $C_{20}H_{18}O_8Hg$ --; line 69, for "on" read -- a --; column 9, line 14, for "200" read -- 2000 --; line 60, for "decadiyne", in italics, read -- dodecadiyne --, in italics; column 11, in the table, fifth column heading, for "$C^3{}_6H_{26}O_8Cl_8Hg$" read -- $C_{36}H_{26}O_8Cl_8Hg$ --.

Signed and sealed this 19th day of November 1963.

(SEAL)
Attest:

ERNEST W. SWIDER
Attesting Officer

EDWIN L. REYNOLDS
Acting Commissioner
of Patents